US009476550B2

United States Patent
McCarthy et al.

(10) Patent No.: US 9,476,550 B2
(45) Date of Patent: Oct. 25, 2016

(54) SELECTIVELY-EXTENDABLE MODULAR LIGHTING FIXTURE

(71) Applicant: Kenall Manufacturing, Inc., Gurnee, IL (US)

(72) Inventors: Charles A. McCarthy, Gurnee, IL (US); James P. Kelly, East Troy, WI (US)

(73) Assignee: Kenall Manufacturing Company, Kenosha, WI (US)

( * ) Notice: Subject to any disclaimer, the term of this patent is extended or adjusted under 35 U.S.C. 154(b) by 604 days.

(21) Appl. No.: 14/036,940

(22) Filed: Sep. 25, 2013

(65) Prior Publication Data

US 2014/0071669 A1    Mar. 13, 2014

Related U.S. Application Data

(63) Continuation of application No. 12/362,287, filed on Jan. 29, 2009, now Pat. No. 8,550,656, which is a continuation of application No. 11/233,893, filed on Nov. 15, 2005, now Pat. No. 7,494,241, which is a (Continued)

(51) Int. Cl.
*F21V 21/00*      (2006.01)
*F21S 2/00*       (2016.01)
(Continued)

(52) U.S. Cl.
CPC .............. *F21S 2/005* (2013.01); *B29D 21/04* (2013.01); *F21S 2/00* (2013.01); *F21V 15/015* (2013.01);
(Continued)

(58) Field of Classification Search
CPC .............. B29D 21/04; F21Y 2103/00; F21Y 2113/00; F21S 4/20; F21S 8/04; F21S 2/005; F21V 5/00; F21V 11/06; F21V 21/14; F21V 17/007; F21V 17/107; F21V 27/00; F21V 3/00; F21V 15/01; F21V 15/015; F21V 21/005
See application file for complete search history.

(56) References Cited

U.S. PATENT DOCUMENTS 1,954,568 A    4/1934  Kenny
2,323,002 A    6/1943  Baker
(Continued)

FOREIGN PATENT DOCUMENTS

DE    2756887 A2    6/1979
DE    3442526 A1    5/1985
(Continued)

OTHER PUBLICATIONS

Undated purported Gardco fixture.
(Continued)

*Primary Examiner* — Hargobind S Sawhney
(74) *Attorney, Agent, or Firm* — Jansson Munger McKinley & Kirby Ltd.

(57) ABSTRACT

A lighting fixture including a housing having sidewalls and lengthwise ends, an elongate lens fitted to the housing with lengthwise end edge portions, a pair of unitary endplates each attachable to either lengthwise end of the housing, each endplate having lens support structure supporting one lengthwise end edge portion of the lens, and each endplate having perimeter surfaces matingly attached to an endcap having a peripheral edge of substantially the same size and contour as the outer surface of the endplate where the endcap and endplate join. Each unitary endplate includes perimeter surfaces matingly attached to a linear bridge, an angular bridge or an endcap having a peripheral edge of substantially the same size and contour as the outer surface of the endplate where the bridge or endcap and endplate join. The endplate support prevents the elongate lens from being pressed inwardly into an interior portion of the lighting fixture.

17 Claims, 8 Drawing Sheets

Related U.S. Application Data continuation of application No. 10/943,692, filed on Sep. 17, 2004, now Pat. No. 6,984,055, which is a continuation of application No. 10/156,423, filed on May 28, 2002, now abandoned.

(51) Int. Cl.

| | | |
|---|---|---|
| *F21V 15/015* | (2006.01) | |
| *F21V 21/005* | (2006.01) | |
| *F21V 21/14* | (2006.01) | |
| *B29D 21/04* | (2006.01) | |
| *F21V 27/00* | (2006.01) | |
| *F21Y 103/00* | (2016.01) | |
| *F21S 8/04* | (2006.01) | |

(52) U.S. Cl.
CPC ............ *F21V 21/005* (2013.01); *F21V 21/14* (2013.01); *F21S 8/04* (2013.01); *F21V 27/00* (2013.01); *F21Y 2103/00* (2013.01)

(56) References Cited

U.S. PATENT DOCUMENTS

| | | |
|---|---|---|
| 2,344,935 A | 3/1944 | Whittaker |
| 2,465,141 A | 3/1949 | Wakefield |
| 2,474,308 A | 6/1949 | Franck et al. |
| 2,535,840 A | 12/1950 | Coyle et al. |
| 2,643,328 A | 6/1953 | Elmendorf |
| 2,988,633 A | 6/1961 | Rosenfield |
| 3,027,451 A | 3/1962 | Thomsen |
| 3,118,620 A | 1/1964 | Bucek |
| 3,120,929 A | 2/1964 | Henning |
| 3,159,352 A | 12/1964 | Wakefield et al. |
| 3,299,264 A | 1/1967 | Lipscomb |
| 3,319,059 A | 5/1967 | Ogden |
| 3,375,322 A | 3/1968 | Serio et al. |
| 3,428,799 A | 2/1969 | Bassani |
| 3,928,757 A | 12/1975 | Nelson |
| 4,025,780 A | 5/1977 | Krase et al. |
| D246,330 S | 11/1977 | Krase et al. |
| 4,092,562 A | 5/1978 | Campbell |
| 4,096,379 A | 6/1978 | Taylor |
| 4,138,716 A | 2/1979 | Muhlethaler et al. |
| 4,323,954 A | 4/1982 | Florence et al. |
| 4,338,653 A | 7/1982 | Marrero |
| 4,413,311 A | 11/1983 | Orenstein |
| 4,420,798 A | 12/1983 | Herst et al. |
| 4,464,707 A | 8/1984 | Forrest |
| 4,574,338 A | 3/1986 | Takasaki et al. |
| 4,633,377 A | 12/1986 | Mackiewicz |
| 4,670,823 A | 6/1987 | Kochi et al. |
| 4,712,165 A | 12/1987 | Cetrone |
| 4,716,671 A | 1/1988 | Gross |
| 4,726,781 A | 2/1988 | Bernhart et al. |
| 4,748,548 A | 5/1988 | Barton |
| 5,025,355 A | 6/1991 | Harwood |
| 5,113,328 A | 5/1992 | Foster et al. |
| D342,523 S | 12/1993 | Morgan et al. |
| 5,386,353 A | 1/1995 | Battaglia |
| 5,390,094 A | 2/1995 | Evanisko |
| 5,404,279 A | 4/1995 | Wood |
| 5,416,683 A | 5/1995 | McCarthy |
| 5,422,800 A | 6/1995 | Entrop et al. |
| 5,564,818 A | 10/1996 | Grossman et al. |
| 5,658,066 A | 8/1997 | Hirsch |
| 5,658,067 A | 8/1997 | Engle et al. |
| 5,702,176 A | 12/1997 | Engle |
| 5,716,123 A | 2/1998 | Lamming |
| 5,902,035 A | 5/1999 | Mui |
| 6,186,642 B1 | 2/2001 | Corcorran et al. |
| 6,186,842 B1 | 2/2001 | Hirschbold et al. |
| 6,305,816 B1 | 10/2001 | Corcorran et al. |
| 6,390,654 B1 | 5/2002 | Diaz et al. |
| 6,435,697 B1 | 8/2002 | Simmons et al. |
| 6,454,431 B1 | 9/2002 | Grossman et al. |
| 6,530,674 B2 | 3/2003 | Grierson et al. |
| 6,536,924 B2 | 3/2003 | Segretto |
| 6,568,830 B2 | 5/2003 | Yaphe et al. |
| 6,652,118 B2 | 11/2003 | Shemitz et al. |
| 6,659,625 B2 | 12/2003 | Hanasaki |
| 6,733,154 B1 | 5/2004 | Dahlen |
| 6,769,784 B2 | 8/2004 | Yaphe et al. |
| 6,984,055 B2 | 1/2006 | McCarthy et al. |
| 7,494,241 B2 | 2/2009 | McCarthy et al. |
| 2002/0118537 A1 | 8/2002 | Segretto |

FOREIGN PATENT DOCUMENTS

| | | |
|---|---|---|
| EP | 0089713 A1 | 3/1983 |
| GB | 1564216 A1 | 4/1980 |

OTHER PUBLICATIONS

Undated H.E. Williams "Al" fixture photos.
Undated H.E. Williams "TL" fixture photos.

SELECTIVELY-EXTENDABLE MODULAR LIGHTING FIXTURE

RELATED APPLICATIONS

The present application is a continuation of patent application Ser. No. 12/362,287, filed Jan. 29, 2009, which will issue as U.S. Pat. No. 8,550,656 on Oct. 8, 2013, which is a continuation of Ser. No. 11/233,893, filed on Nov. 15, 2005, now U.S. Pat. No. 7,494,241, which is a continuation of patent application Ser. No. 10/943,692, filed on Sep. 17, 2004, now U.S. Pat. No. 6,984,055, which is a continuation of application Ser. No. 10/156,423, filed May 28, 2002, now abandoned, the entire contents of which are incorporated herein by reference.

FIELD OF THE INVENTION

The invention relates generally to a lighting fixture and, more particularly, to a modular lighting fixture adaptable for being implemented in various shapes and configurations.

BACKGROUND OF THE INVENTION

Many different types of lighting fixtures, including elongate fixtures for various applications and locations, are known in the art. Such fixtures have been installed for illuminating stores, offices, supermarkets, schools, hospitals, banks, and other interior and exterior areas. Appreciating the versatility of such lighting fixtures, including the many engineering designs and configurations, there remains a need for improving versatility and adaptability of a lighting fixture, in order to facilitate and enhance particular applications.

Traditional lighting fixtures are not readily adaptable for adjusting length and changing physical configuration. In particular, conventional structures and lighting methods are not adapted for selectively implementing fixtures having different shapes.

OBJECTS OF THE INVENTION

It is an object of the invention to provide an improved system for implementing lighting fixtures overcoming some of the problems and shortcomings of the prior art, including those referred to above.

Another object of the invention is to provide a modular lighting system easily adaptable for creating different shapes and configurations in linear lighting applications.

Another object of the invention is to provide a lighting system that provides one or more isolated raceways for other distribution applications, for example low voltage wiring, fiber optics, and others.

Still another object of the invention is to provide a system for sealingly connecting linear lighting modules to one another.

Yet another object of the invention is to provide a modular lighting system that allows a designer to implement linear lighting using any number of modules having selectable lengths.

How these and other objects are accomplished will become apparent from the following descriptions and drawing figures.

SUMMARY OF THE INVENTION

According to an aspect of the invention, a modular lighting fixture includes first and second elongate housings each having ends and sidewalls, first and second pairs of unitary endplates respectively mated with the ends of the first and second elongate housings, the endplates each having a peripheral rim, and a bridge adapted for joining one of the endplates plates of the first elongate housing with one of the endplates of the second elongate housing by sealing cooperation with the respective peripheral rims thereof.

According to another aspect of the invention, a modular lighting fixture includes first and second elongate linear housings each having ends and sidewalls, and a bridge adapted for sealingly connecting one of the ends of the first elongate housing to one of the ends of the second elongate linear housing, and for angularly disposing the second elongate linear housing.

According to another aspect of the invention, a modular lighting fixture includes a first elongate housing having ends and sidewalls, a unitary endplate adapted for sealing connection to an end of the first elongate housing, and a bridge for sealingly connecting the endplate to at least one additional structure, the bridge being one of an L, T, +, and X type.

According to another aspect of the invention, a modular lighting fixture includes first and second elongate housings each having ends and sidewalls, and a bridge structured for sealing connection of the first and second elongate housings to one another at respective ones of their ends; wherein the first and second elongate housings, when so connected, are non-collinear.

According to another aspect of the invention, a modular lighting fixture includes an elongate housing having lengthwise ends and sidewalls, and a pair of unitary endplates adapted for sealing attachment to either lengthwise end of the housing, each of the endplates having respective perimeter surfaces adapted for attachment to any one of a bridge adapted for angularly-directable extension of the housing, a bridge adapted for linear extension of the housing, and an endcap.

According to another aspect of the invention, a modular lighting fixture includes an elongate housing having two ends and sidewalls, and at least one unitary endplate engageable with one of the ends of the elongate housing, where, when the endplate is engaged with the elongate housing, at least two isolated raceways extend through the elongate housing and the endplate.

According to another aspect of the invention, a modular lighting fixture includes first and second elongate housings each having ends and sidewalls, two unitary endplates, each having two non-symmetrical end walls, disposed between the first and second elongate housings, an elongate lens attached to the first elongate housing, and a gasket disposed between the lens and the first elongate housing for providing fluid-impervious sealing between the lens and the first elongate housing.

According to another aspect of the invention, a modular lighting fixture includes a lighting fixture module having ends and sidewalls, and a unitary endplate affixed at each of the ends of the lighting fixture module, the endplate including an arcuate, inwardly-directed groove adapted for sealingly receiving an end edge portion of a lens.

According to another aspect of the invention, a modular lighting fixture includes an elongate lighting fixture housing having ends and sidewalls, a pair of unitary endplates respectively affixed at each of the ends of the lighting fixture housing, and an elongate lens adapted for mating attachment to the lighting fixture housing and having flanges along elongate sides thereof that overlie the lighting fixture housing.

According to another aspect of the invention, a modular lighting fixture includes a lens having a flange extending symmetrically along each of two longitudinal edges of the lens, and a linear-type lighting fixture housing having slot-like grooves extending along sidewalls of the housing, the grooves being adapted for receiving respective ones of the flanges therein, where attachment of the flanges in the grooves effects fluid-impervious sealing between the lens and the housing.

According to another aspect of the invention, a method of modular lighting fixturing includes providing an elongate first housing having ends and sidewalls, and providing a pair of unitary endplates with respective perimeter surfaces adapted for mating attachment to either end of the first housing, each of the endplates being attachable to any of an angularly-disposing bridge, a ring, and an endcap, where the bridge defines a structure adapted for angularly-directable extension of the first housing, and where the ring defines a structure adapted for linear extension of the first housing.

According to another aspect of the invention, a method of lighting includes providing a fluid-impervious lighting fixture adapted for being installed as any of an individual linear housing section, a continuous lighting fixture made up of individual linear housing sections, and a geometric linear lighting fixture made up of individual linear housing sections.

According to another aspect of the invention, a method includes providing a selectable number of linear lighting modules each adapted for being joined at an end thereof to an end of another of the linear lighting modules, each of the linear lighting modules being of a selectable length, and joining the selected number of linear lighting modules together to form a lighting fixture having two isolated raceways therein.

According to another aspect of the invention, a method of providing a lighting fixture includes providing first and second housing sections each having opposite ends and sidewalls, mounting a unitary endplate to the opposite ends of each of the first and second housings, and sealingly joining together one of the mounted endplates for each of the first and second housing sections, thereby sealingly connecting the first and second housing sections to one another.

As a result of implementing certain aspects of the invention, lighting fixtures may be characterized as providing "selectably-extendable" and angularly-directable linear lighting." For example, by joining a number of modules, sections, or housing components to one another at end portions or segments thereof, a lineal array of selectable length or lineal expanse may be provided as required or desired. Alternatively, the fixture may consist of two linear arrays connected at ends thereof to define an angle, for example a 90 degree juncture or corner. In another example, lineal sectors or sections may be oriented with respect to one another to provide various different geometric configurations or shapes. Accordingly, a large variety of lighting design choices may be implemented efficiently. In addition, a structure according to the invention also provides fluid-impervious sealing.

Other and further objects, features and advantages of the invention will become apparent from the following further description considered with the drawing figures.

The foregoing summary does not limit the invention, which is instead defined by the attached claims.

DETAILED DESCRIPTION OF PREFERRED EMBODIMENTS

Figures 1, 2:
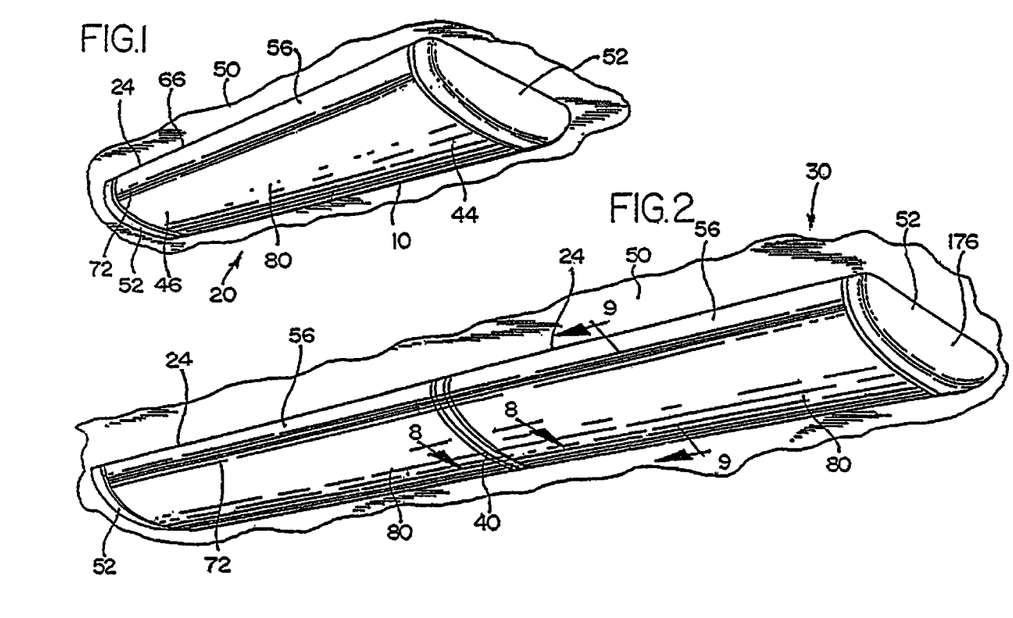
FIG. 1 is a perspective view of a luminaire-type linear lighting fixture module having an endcap, according to an exemplary embodiment of the invention.
FIG. 2 shows two modular lighting fixture sections joined endwise to one another through an interposed coupler ring, according to an exemplary embodiment of the invention.

FIG. 1 is a perspective view of a lighting fixture module 24 that may be configured in any of several different forms, in this case being configured as a single module fixture 20 by adding endcaps 52. Module 24 may also be referred to herein as "housing section 24" that includes a body section 10 and a pair of unitary endplates 34. Module 24 may also include a lens 80.

FIG. 2 shows a dual-module lighting fixture 30 having two housing sections 24. The two housing sections 24 of fixture 30 are secured end-to-end to one another at respective facing endplates 34 thereof (e.g., FIGS. 3-5, 7, 8), by a coupler 40 interposed between the respective unitary endplates 34.

Either fixture 20, 30 may be securely mounted at respective generally planar bases 48 thereof to a ceiling or similar structure 50. Free ends of housing section 24 may be sealed at unitary endplates 34 thereof with fitted endcaps 52. Endcap 52 abuts and is securely mounted to endplate 34, as shown by way of example in FIG. 3. Each housing section 24 includes opposed lineally-extending side walls 56, 58 extending coextensively with base 48 at elongate upper edges 64 and 66 thereof.

Housing sidewalls 56, 58 of elongate modular lineal section 24 are formed of an extruded high-strength metal alloy, such as aluminum alloys, as a body portion 10 of each modular sections 24. Sidewalls 56, 58 are formed at opposite elongate edge portions thereof with channel-like, downwardly-opening grooves 96, 98 that matingly receive therewithin the elongate free edge portions of lens 80. A gasket (not shown) may also be used for sealing the elongate sides of lens 80 with elongate grooves 96, 98 of housing 24. Lens 80 is preferably formed of a high-strength plastic composition.

Elongate, sheet-like, arcuate lens 80 extends generally along the bottom of housing section 24 and is secured at its lengthwise sides to longitudinally-extending lower free edges 72, 74 of the opposed sidewalls 56 and 58 of housing section 24. In one embodiment, lens 80 has upwardly-directed flanges 86, 88 (e.g., FIGS. 9A-9B) that respectively seat within downwardly-opening elongate grooves or slots 204, 206 in unitary endplate 34 and in channels 96 and 98 formed in lower free elongate opposed edge zones 104 and 106 of housing sidewalls 56 and 58.

Each unitary endplate 34 is formed at an inner face thereof with an arcuate, inwardly-opening slot or groove 200 extending along a bounding peripheral edge zone thereof for slideably receiving, to seat in sealing engagement therewith, an end-edge portion of lens 80, thereby providing sealing engagement of lens 80 with groove 200. The inner face of unitary endplate 34 is also formed for accepting therewithin, in mating and sealing engagement, the extruded housing 24.

For example, downwardly-projecting strips 110, 112 respectively extend longitudinally along a lineal expanse of sidewalls 56, 58. At their free end-edges, strips 110, 112 respectively abut in sealing engagement with unitary endplate 34. Channel 200, which opens outwardly, is contoured, configured and sized at its opposite lateral portions for receiving in close and sealing engagement therewithin the respective opposed edge portions 72 and 74 of the sidewalls 56 and 58.

Figure 9A:
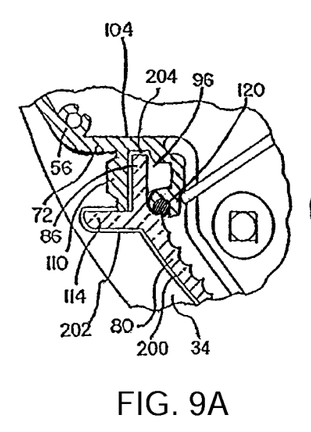
FIGS. 9A and 9B are fragmentary, cross-sectional views taken along the line 9-9 of FIG. 2, with parts omitted for clarity, according to an exemplary embodiment of the invention.
Figure 9B:
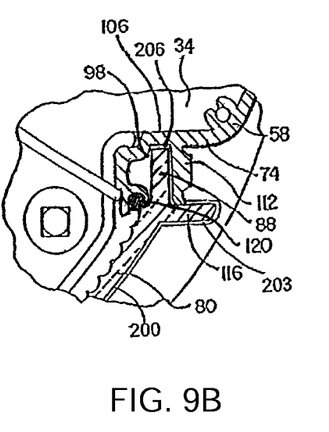

As shown in FIGS. 9A-9B, a gasket 120 may be interposed to sealingly engage the strips 110, 112 and lens 80. As shown in FIGS. 9A-9B, channel 200 of unitary endplate 34 may be aligned with corresponding channels 96, 98 of housing 24.

Unitary endplates 34 are structured in a skeletal, bridge-like manner for mating engagement and positive attachment to each end of housing section 24, thereby providing through-frame openings. Skeletal adapter ring 40 is attachable to either unitary endplate 34 for facilitating attachment of an additional housing section or module 24 to provide a lighting fixture comprised of two or more modular housing sections 24.

Unitary endplates 34 may be formed as high-strength castings having a metal composition, preferably being composed of a lightweight material such as an aluminum alloy. Unitary endplates 34 have an inner face perimeter contour corresponding to a perimeter contour of the combined endwise edge of the housing section 24 including an attached lens 80. The outer face perimeter contour of unitary endplate 34 corresponds to a perimeter contour of the ring 40, endcap 52, or other bridge being attached to endplate 34. For example, unitary endplate 34 may have a perimeter shoulder 205 for sealingly engaging either an inner rim 226 of coupler ring 40 or an inner edge 160 of endcap 52 to be secured thereon.

Ring 40 has a circumscribing top wall that is integrally-formed with laterally-extending ring-like flanges 220 dimensioned and configured to overlie in sealing engagement therewith a mating 152 wall of unitary endplate 34 formed adjacent shoulder portion 205.

Figure 3:
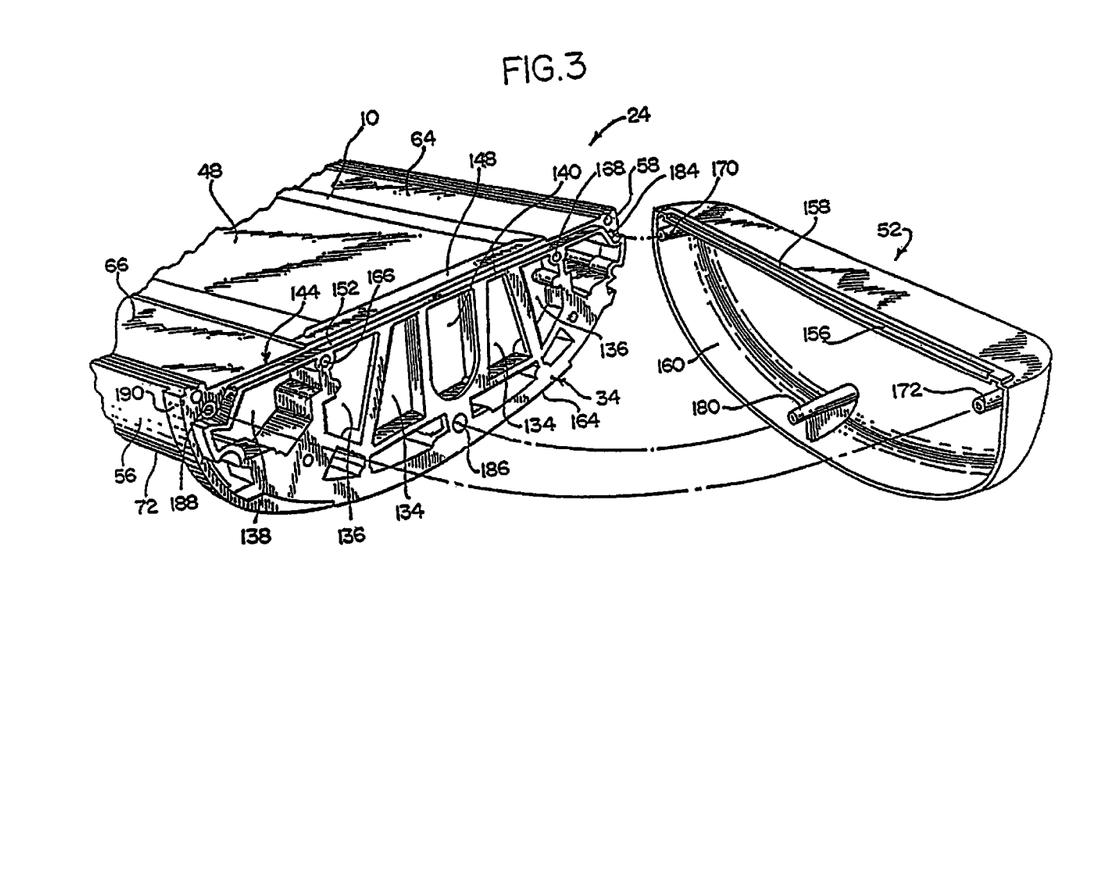
FIG. 3 is a fragmentary perspective view of a body section of a lighting fixture with a unitary endplate affixed to the body section of the lighting fixture for attachment to an endcap, according to an exemplary embodiment of the invention.
Figure 4:
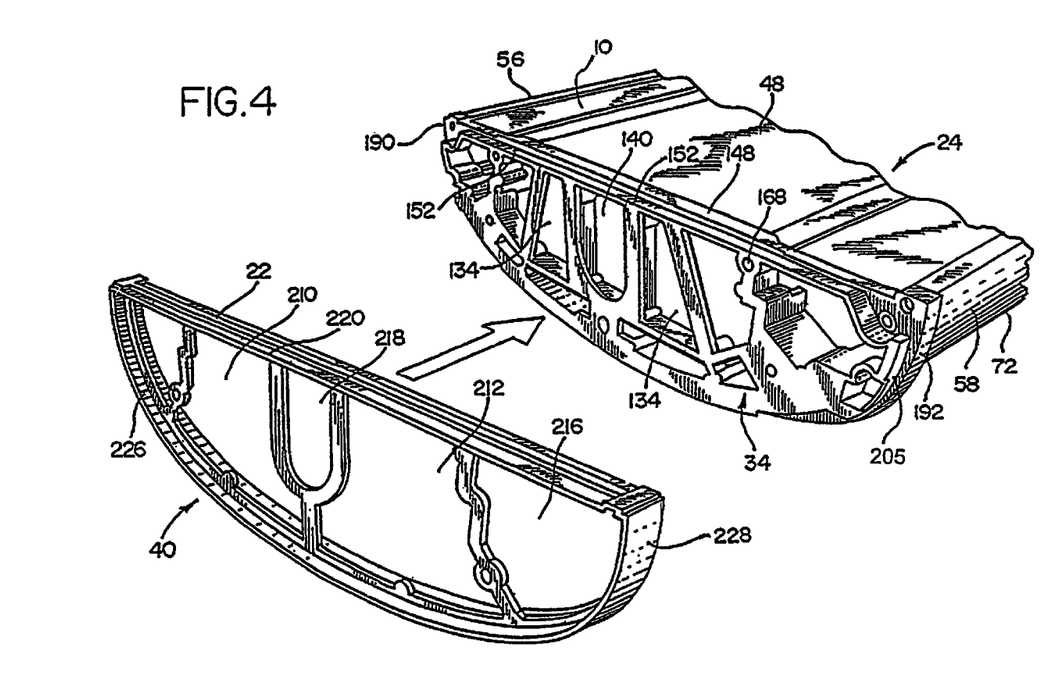
FIG. 4 is a partially-exploded fragmentary perspective view showing an end of a body section of a lighting fixture module with a unitary endplate secured in place for attachment to a ring-type coupling bridge, according to an exemplary embodiment of the invention.
Figure 5:
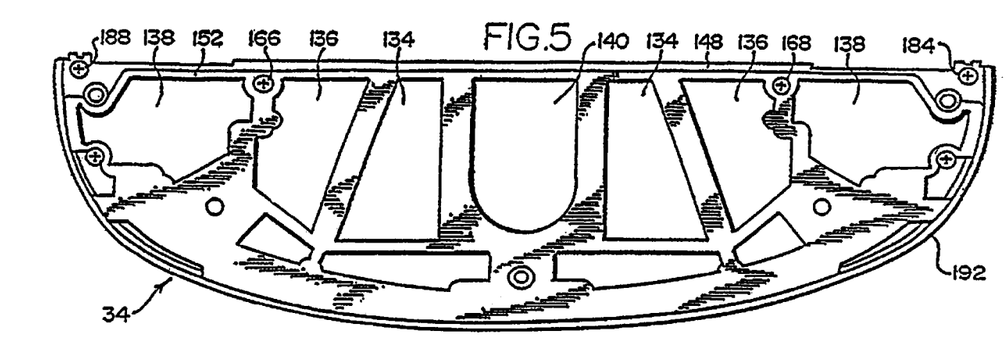
FIG. 5 is an elevational view of a unitary endplate for mounting on an end of the body of a housing section of a lighting fixture module, according to an exemplary embodiment of the invention.
Figure 6:
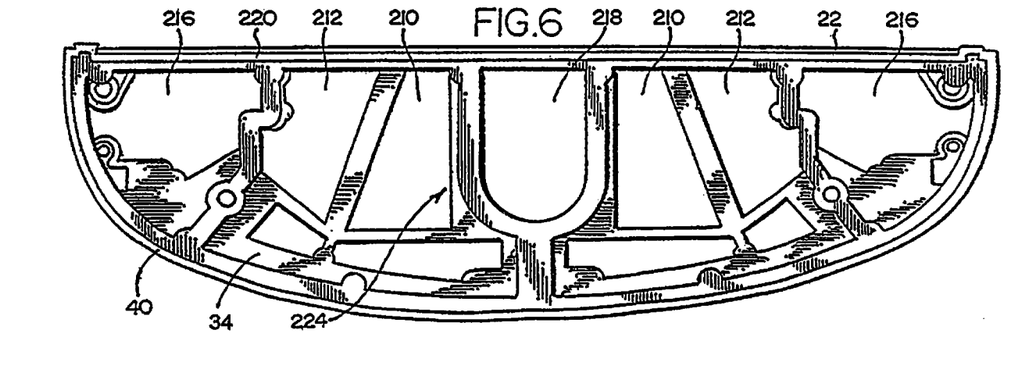
FIG. 6 is an elevational view of a ring-type coupling bridge secured to the unitary endplate of FIG. 5, according to an exemplary embodiment of the invention.
Figure 7:
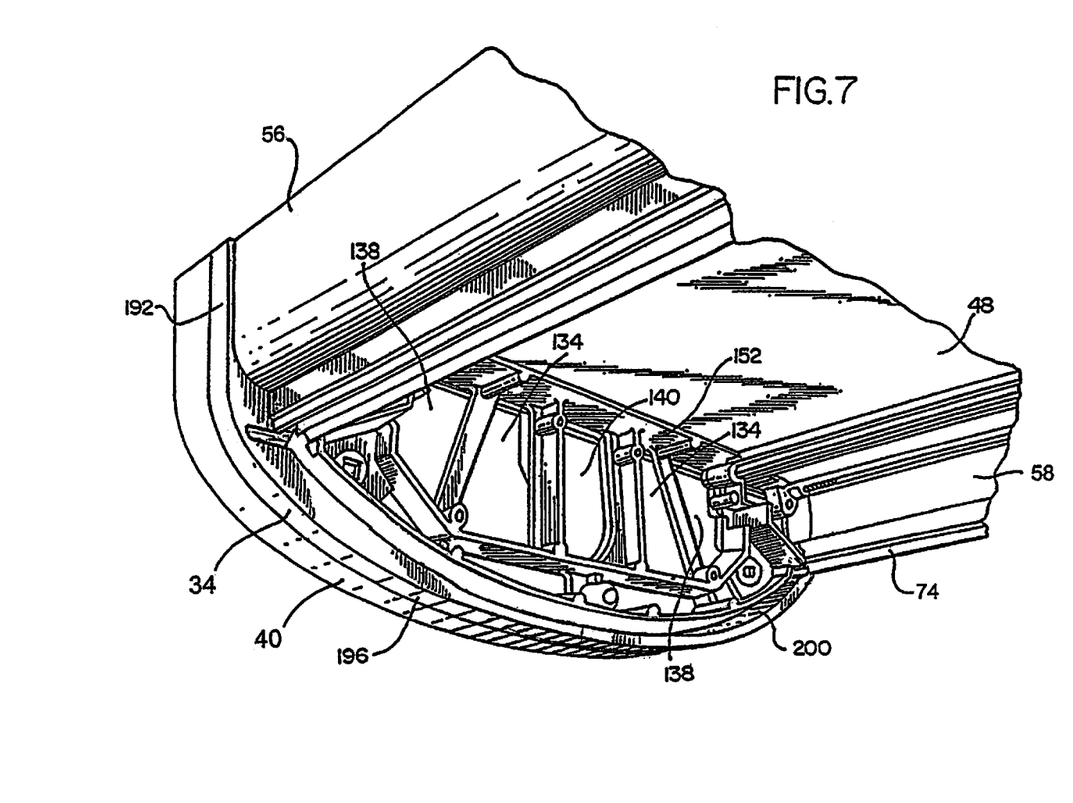
FIG. 7 is a fragmentary upward perspective view, with parts omitted for clarity, showing a housing section having a unitary endplate with a coupler fastened thereto, according to an exemplary embodiment of the invention.
Figure 8:
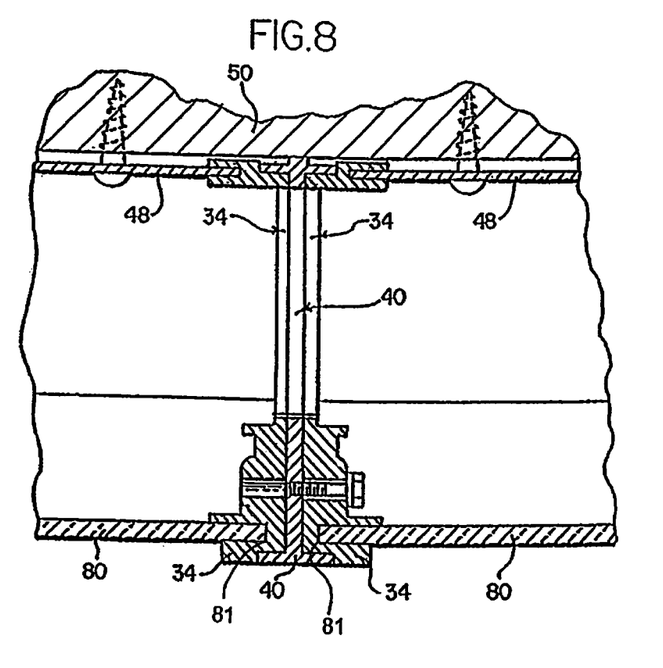
FIG. 8 is a cross-sectional view taken substantially along the line 8-8 of FIG. 2, and illustrating a manner of securing one housing section or lighting fixture module to another, according to an exemplary embodiment of the invention.

As shown by way of example in FIGS. 3 and 4, a unitary endplate 34 is securely engaged with body portion 10 at each end thereof, thereby forming a housing section 24. Unitary endplate 34 has a plate-like, skeletal body 142 having a plurality of through-openings or passageways 134, 136, 138 and 140 formed therein. Such passageways 134, 136, 138, 140 provide wire routing structures that facilitate passage therethrough of electrical wires, illuminating sources, other electrical components, and related structures such as various cabling, adapters, etc. As described in more detail below, passageways 134, 136, 138, 140 may each be parts of individual isolated raceways extending the entire length of module 24 by including enclosed passages within body portion 10. Unitary endplate 34 has a top flange 148 which extends continuously along a top end edge of the base 48 for sealing engagement with housing section 24. Integrally-formed with and coextensive with the top flange 148 and stepped downwardly with respect thereto is a second flange 152.

Unitary endplate 34 is formed with opposed upper side sectors 190, 192 and a continuing lower arcuate section 196 thereof. As shown in the interior view of FIG. 7, the interior side of unitary endplate 34 has an uninterrupted channel 200. Channel 200 is configured and sized for receiving in sealing engagement therewith the end portions 81 of lens 80. Channel 200 of unitary endplate 34, as shown by example in FIGS. 9A-9B, has laterally-extending portions 202, 203 structured for respectively receiving outward-extending flanges 114, 116 of lens 80. Similarly, vertically-oriented flange portions 86, 88 of lens 80 respectively fit into channels 204, 206 of unitary endplate 34. Gasket 120 may be formed in an appropriate manner for sealing of endplate 34, for example by being interposed for sealingly engaging strips 110, 112 and lens 80. Gaskets can include die-cut gaskets and the like. Lens 80 provides distribution of illuminating light emanating from the fixture, and is preferably composed of a high-impact, shock-resistant plastic composition, such as an acrylic plastic or a polycarbonate plastic. As shown in the example of FIGS. 9A-9B, lens 80 is formed to engage channel 200.

Endcap 52 is integrally formed with a flange 156 projecting outwardly along a top, free edge 158 thereof. When endcap 52 is positioned in place to mate with and close the end of housing section 24, the top flange 156 of endcap 52 is brought to overlie and to effect a sealing engagement with flange 152 of unitary endplate 34. An arcuate lower flange 160 of endcap 52 engages and seals with a cooperating lower flange 164 of unitary endplate 34. Unitary endplate 34 is positively secured to the end of body portion 10 of housing section 24 with screws (not shown).

Endcap 52 is integrally formed with connector posts 170 and 172 projecting from the interior of the end wall 176 at opposed upper corners thereof. A third connector post 180, also integrally formed with the endcap 52, projects inwardly from the interior of the end wall 176 at a central lower area thereof. When endcap 52 is positioned in place, the free ends of posts 170, 172 and 180 penetrate to seat, respectively, in cooperating outwardly-presented bores 184, 188 and 186 formed in unitary endplate 34.

Housing sections 24, which may be of any practical selectable lengths, each have a unitary endplate 34 at lengthwise ends thereof. Outer faces of unitary endplates 34 of two linearly-adjacent housing sections 24 are brought matingly to engage an interposed coupling ring 40, thus to effect a sealed joinder of the two adjacent housing modules 24. For example, lighting fixture 20 has a single module 24 of selectable length; alternatively, any number of modular sections 24 may be joined to one another endwise as a lineal or in-line array, such as two-module lighting fixture 30 shown in FIG. 2 with coupler ring 40 being used to lineally connect modules 24 as shown in FIG. 4. Such is effective to provide a lineal lighting fixture of any desired or required expanse.

In the example where two or more housing sections 24 joined endwise as a continuous uninterrupted physical structure (e.g., FIG. 2) with a coupler ring 40 (e.g., FIG. 4), coupler ring 40 has generally a contour and form compatible with unitary endplate 34 and is preferably formed as a metal casting of an aluminum alloy or similar material. Coupler ring 40 is formed with a plurality of through-openings 210, 212, 216 and 218. Such openings essentially correspond with openings formed in the unitary endplate 34 and are in through-registry therewith when endplate 34 and coupler ring 40 are joined together in an assembled lighting fixture having a plurality of body sectors or modules 24.

Coupler ring 40 has a transversely-extending generally-planar top surface 220 and an arcuate bottom surface 228, the flange-like top wall 220 extending laterally of the body 224 at each of opposed sides thereof effectively to provide two opposed flanges straddling a center portion 22. Flange-like top wall 220 may be engaged with a downwardly-displaced or stepped flange 152 of a unitary endplate 34. Unitary endplate 34 is secured to body portion 10 of housing module 24 as previously described. A second lighting fixture module 24 may be fastened, at its secured unitary endplate 34 at the opposite, coextensive second part of the flange 220 thus to effect a coupling of two housing sections 24 to one another endwise. In the manner described, it becomes simple and quick to produce a row-mount lighting fixture having a selectable number of separate housing sections each being of a selectable length. Thus, one may readily assemble a lighting fixture of any final overall length, as may be required or desired.

A lighting fixture may include either a single module 24 of selectable length or, alternatively, a plurality of modular sections, sectors, or housing sections 24. Such may be joined to one another endwise as a lineal or in-line array. The method is readily effective to provide a lineal lighting fixture of any desired or required expanse. Many other embodiments of the invention are possible. Modular sections 24 maybe coupled at joined ends thereof to extend normally to one another to define a right-angle corner. Others may be connected by means of a T-shaped coupler to form a "T". Still other modular sections, of selectable lengths, may be connected to form an "X" or a cross "+". Since each module 24 has unitary endplates 34 attached thereto, the chosen coupler is adapted to be secured to the respective unitary endplate 34.

Figures 10, 11:
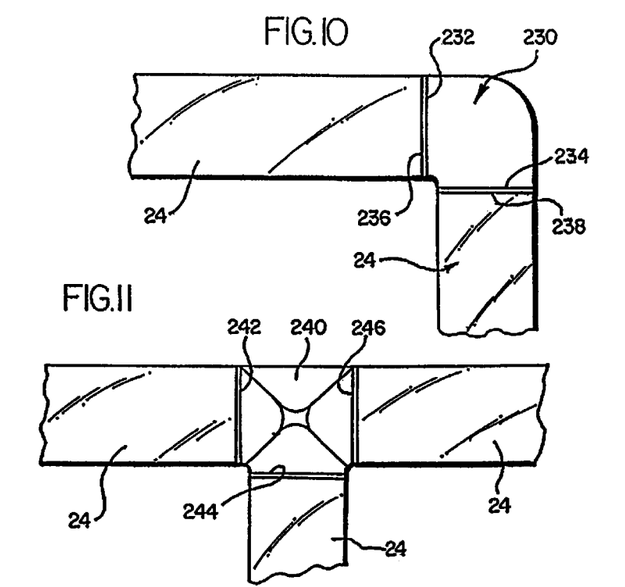
FIG. 10 is a schematic plan view of two modular sections joined to one another at right angles by means of an "L" type connecting adapter to form an L-node or corner mode assembly, according to an exemplary embodiment of the invention.
FIG. 11 is a schematic plan view showing three lighting fixture modules connected to a joinder adapter configured as a "T" node, according to an exemplary embodiment of the invention.
Figure 12:
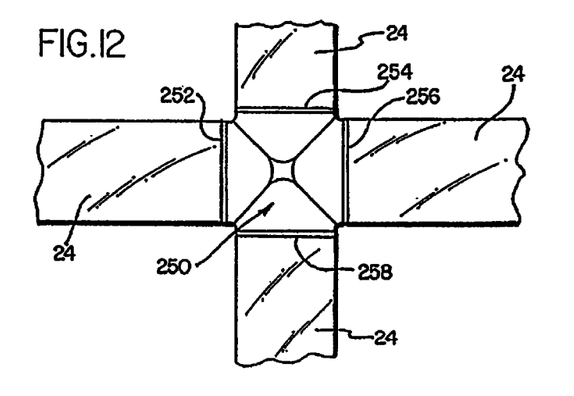
FIG. 12 is a schematic plan view of four lighting fixture modules joined to a rectangular, four-place coupler to form a "+" node type lighting fixture assembly in which the four modules arms extend at 90 degrees with respect to adjacent modules, according to an exemplary embodiment of the invention.

Referring now to FIGS. 10, 11, and 12, lighting fixture embodiments are not limited to extending along a straight line, but may include other geometric configurations. For example, referring first to FIG. 10, there is shown a fragmentary view of a lighting fixture having two modular sections 24 oriented to extend orthogonally with respect to one another. A generally rectangular connector 230 with an "L" shape has a pair of adjacent sides 232 and 234 to which ends 236 and 238 of the modular sections 24 are sealingly joined to form a corner assembly. The resulting fixture having an L shape is suited, for example, for accommodating sharp bends, and for corner installations. Various combinations may be implemented. For example, a use of four such L connectors 230 and four modular sections 24 may be assembled to provide a lighting fixture in the physical configuration of a closed rectangular "loop."

In another example of a non-linear embodiment, FIG. 11 shows a generally rectangular connector 240 having three sides 242, 244, 246 to which three corresponding separate modular sections 24 of the fixture are connected. The assembled fixture of FIG. 11 thus assumes a "T" configuration.

Yet another embodiment of the invention is depicted in FIG. 12. As shown, a four-sided rectangular connector 250 has four sides to which a corresponding end 252, 254, 256, 258 of a separate module or fixture section 24 is joined. There results a fixture having a cross ("+") type configuration. Further, an "X" type configuration of a lighting fixture may be formed. It will be appreciated that, through the selection and use of appropriate connectors, various open and closed loop lighting fixtures may be provided.

Individual and joined bridges and/or housing sections 24 of a given lighting fixture establish therein, and along an entire expanse thereof, uninterrupted passageways. Such passageways may include "raceways" for accommodating wires, cables and the like. Such may be effectively isolated from ballasts and lamp wires. By providing physical barriers establishing and effectively separating a number of isolated raceways, for example, a passageway for the ballast power feed wires of a fluorescent lighting fixture does not interfere with the isolated raceways. Such a physical structural arrangement is highly desirable and is considered novel. The structural arrangement and configuration of lighting fixtures in accordance with the present invention may be utilized for effecting important physical separation of high voltage and low voltage wiring. The utility and versatility of such lighting fixtures are thereby enhanced. The structures of unitary endplate 34 and coaxial coupler ring 40 are skeletal in construction with a plurality of through-openings or passageways or runs. Such may provide coupling elements of extended raceways between modules 24.

For example, items that may be safely housed in an isolated raceway such as one contained in fixtures according to the present invention, include 24-volt alarm circuitry, such as wiring for a fire alarm, fiber optic network cables, thermostat wires, telephone wires, etc. Such capabilities provided by the present invention are believed to be capabilities unique in lighting fixtures of a general linear-type.

It may be especially advantageous and convenient to fabricate all of the modular body sections 24 of a lighting fixture to be a same length. However, such arbitrary uniformity is in no sense a requirement. Conveniently, for example, individual luminaires may be formed using sections 24 nominally 8"×24", 8"×48", 8"×60", etc. Other embodiments may be formed using sections 24 nominally 12"×24", 12"×48", 12"×60", etc.

As a result of the present invention, an extendable modular lighting fixture may be structured to provide interconnections having physical and electrical continuity. Such a structure is effectively tolerant of and resistant to physical abuse as well as to environmental hazards. The lighting fixture may include a linear illumination source and a lighting track in the housing, the lighting track including a passageway structured for accommodating electrical conductors for connecting the lighting fixture to an independent electrical power supply. Wire-ways may be formed within the lighting fixture for accommodating conductive wires. The lighting fixture may further include a gasket seated and secured in the housing along an expanse thereof and in sealing engagement for sealing the housing against invasion by objectionable ambient and foreign substances. A lighting fixture may further include a gasket disposed between the body of the fixture and its lens for establishing a fluid-impervious seal between the body of the fixture and the lens. Various structures may be used to establish a fluid-impervious seal between the body of the fixture and the lens.

A method of making and assembling a lighting fixture having any selectable length and finding utility in ceiling, wall and corner installations including suspended mounts may include utilizing modular components in selectable numbers, each component being of any desired length, the components being connectable to one another endwise as a sealed, operating assemblage constituting a lighting fixture. A method may include mounting a unitary endplate 34 on the housing-like body section 24 coaxially therewith at each end thereof.

A method may include fabricating any of the various components, such as by casting. A method may include forming the unitary endplates 34 to define a parametric contour corresponding to a parametric contour of each end-edge of housing section 24, including a surmounting lens 80 of housing section 24. A method may include casting endplates 34 to define a lattice-like wall configuration including a plurality of dividers and through-openings demarking passageways in end walls of housing section 24. A method may include forming a unitary endplate 34, at an inwardly-presented limit thereof, with a coupling structure for engaging end structures of functionally-united, intercoupling and extending ends including extrusion and lens 80. A method may include forming a side or face of unitary endplate 34, opposite the side of lens 80, with a circumscribing perimeter shoulder for selectively-sealingly engaging either one of a coupler ring to be sleevedly attached thereto, or an endcap of another module 24.

Further, a method may include forming a casting as a bilateral coupler to be secured to a free end of a unitary endplate 34 mounted on an end of a body section 24. Such a casting may be formed as a ring 40 including at a circumscribing top wall thereof integrally-formed, laterally-extending ring-like flanges each being dimensioned and configured to overlie in sealing engagement therewith a mating top wall of a unitary endplate 34. Such may provide a positive endwise joinder of two housing sections 24 to one another in a lineal array. A method may include forming an endcap 52 of a unitary one-piece configuration having a base, an upstanding endwall, and a top, and defining an integrally-formed, uninterrupted, circumscribing free edge contoured to be congruently fittable over a corresponding circumscribing parametric shoulder of a unitary endplate 34 in sealing engagement therewith.

A method may include forming plastic lens 80 to define along each extending edge thereof with an angled flange for overlying an edge of the coextensive extruded base of housing or body section 24. A method may include forming unitary endplate 34, at an inner face thereof, with an outwardly-opening slot or groove extending along a bounding coextensive edge zone thereof for accepting therewithin, in mating and sealing engagement therewith, the extruded metallic base component of the housing and the plastic lens thereof.

A method may include configuring a unitary endplate, at one of its faces, to define an end face contoured for mounting thereon and affixing thereto, selectively, either an endcap 52 for capping and closing housing 24 of the modular structure, or a ring 40 in the form of a band-like coupler. The method may include configuring such a coupler for sealingly mounting onto a unitary endplate 34 of housing 24 for joining the end of housing section 24 to unitary endplate 34 of a housing body of a second modular housing section 24 of the lighting fixture so that the sections are sealingly joined to one another endwise.

A method may include forming an endcap 52 with an integral, circumambient, outwardly-projecting, flange-like edge portion configured to overlie, in sealing engagement therewith, a perimetric shoulder circumscribing an outwardly-presented face of a unitary endplate 34 attached to housing 24.

While the principles of the invention have been described in connection with presently preferred embodiment of the present invention, it will be understood by those skilled in the art that many changes in construction and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A lighting fixture comprising:
an elongate modular housing having sidewalls and lengthwise ends;
an elongate lens fitted to the housing and having lengthwise end edge portions each of which has a respective flange; and
a pair of unitary endplates each attachable to either lengthwise end of the housing at a first side of the endplate, each endplate having a lens support structure on the first side of the endplate to support one of the lengthwise end edge portions of the lens, each endplate having a second side, opposite the first side, with a perimeter surface at which an endcap is matingly attached, the endcap having a peripheral edge of substantially the same size and contour as an outer surface of the endplate where the endcap and endplate join, each endplate first side including structure forming grooves each for receiving a respective flange of the lens end edge portions.

2. The lighting fixture of claim 1 wherein each end edge portion of the lens is received by the lens support structure on the second side of each endplate to provide a snug fit between the lens and the endplate.

3. The lighting fixture of claim 2 further comprising a gasket positioned between each endplate and the lens.

4. A lighting fixture comprising:
an elongate modular housing having sidewalls and lengthwise ends;
an elongate lens fitted to the housing and having lengthwise end edge portions; and
a pair of unitary endplates each having an inside surface and being attachable to either lengthwise end of the housing, each endplate having a lens supporting structure on the inside surface, each lengthwise end edge portion of the lens being received within the lens supporting structure on the inside surface of the endplate, each endplate having respective perimeter surfaces matingly attached to a bridge for linear extension of the housing, and bridge having an outer surface of substantially the same size as the outer surface of the endplate where the bridge and endplate join.

5. The lighting fixture of claim 4 wherein each end edge portion of the lens is received by the lens supporting structure on the inside surface of each endplate to provide a snug fit between the lens and the endplate.

6. The lighting fixture of claim 5 further comprising a gasket positioned between each endplate and the lens.

7. The lighting fixture of claim 4 further comprising a flange on each opposite lengthwise end edge portion of the lens, and each endplate including structure forming a groove for receiving a respective flange of the lens.

8. A lighting fixture comprising:
 an elongate modular housing having sidewalls and lengthwise ends, the sidewalls having downwardly-opening grooves along elongate sides thereof;
 an elongate lens having flanges along two opposite sides thereof with lengthwise end edge portions, the flanges received in the downwardly-opening grooves of the housing; and
 a pair of unitary endplates each including an endplate support for supporting a lengthwise end edge portion of the lens, each endplate being attached to either lengthwise end of the housing and having perimeter surfaces matingly attached to:
  (a) a bridge for angularly-directed extension of the housing and having a peripheral edge of substantially the same size and contour as an outer surface of the endplate where the bridge and endplate join,
  (b) a bridge for linear extension of the housing and having a peripheral edge of substantially the same size and contour as the outer surface of the endplate where the bridge and endplate join, or
  (c) an endcap having a peripheral edge of substantially the same size and contour as an outer surface of the endplate where the endcap and endplate join.

9. The lighting fixture of claim 8 wherein the endcap has an outwardly-projecting flange matingly engaging an outwardly-presented face of one of the endplates.

10. The lighting fixture of claim 8 wherein each of the endplate supports are at least partially aligned with respective ones of the downwardly-opening grooves of the housing.

11. The lighting fixture of claim 8 wherein the lens includes end edge portions, and wherein each of the endplate supports slidably receives one of the end edge portions of the lens to thereby seat the lens.

12. The lighting fixture of claim 8 wherein each endplate has supports forming a mounting space for receiving respective ones of the flanges.

13. The lighting fixture of claim 8 including a second lens flange along the opposite elongate sides of the lens, each second lens flange overhangs a respective portion of the downwardly-opening grooves of the housing.

14. The lighting fixture of claim 8 wherein each endplate support secures a respective end of the elongate lens to the endplate, or prevents the respective end of the elongate lens from being pressed inwardly into an interior portion of the lighting fixture by an external force.

15. The lighting fixture of claim 14 wherein the endplate support is integrally formed in each of the endplates.

16. The lighting fixture of claim 8 wherein the lens has end edge portions, and wherein at least one of the endplates includes a support covering a respective one of the end edge portions of the lens, thereby preventing external access to the one end edge portion of the lens.

17. The lighting fixture of claim 8 further comprising a gasket between each of the endplates and the lens.

* * * * *

Disclaimer

9,476,550 B2 — Charles A. McCarthy, Gurnee, IL (US); James P. Kelly, East Troy, WI (US). SELECTIVELY-EXTENDABLE MODULAR LIGHTING FIXTURE. Patent dated October 25, 2016. Disclaimer filed January 26, 2017, by the assignee, Kenall Manufacturing Co.

Hereby disclaims the term of this patent which would extend beyond Patent No. 6,984,055.

*(Official Gazette, September 19, 2017)*